(No Model.) 2 Sheets—Sheet 1.
J. PARKER.
CANE SHREDDING MACHINE.
No. 387,438. Patented Aug. 7, 1888.
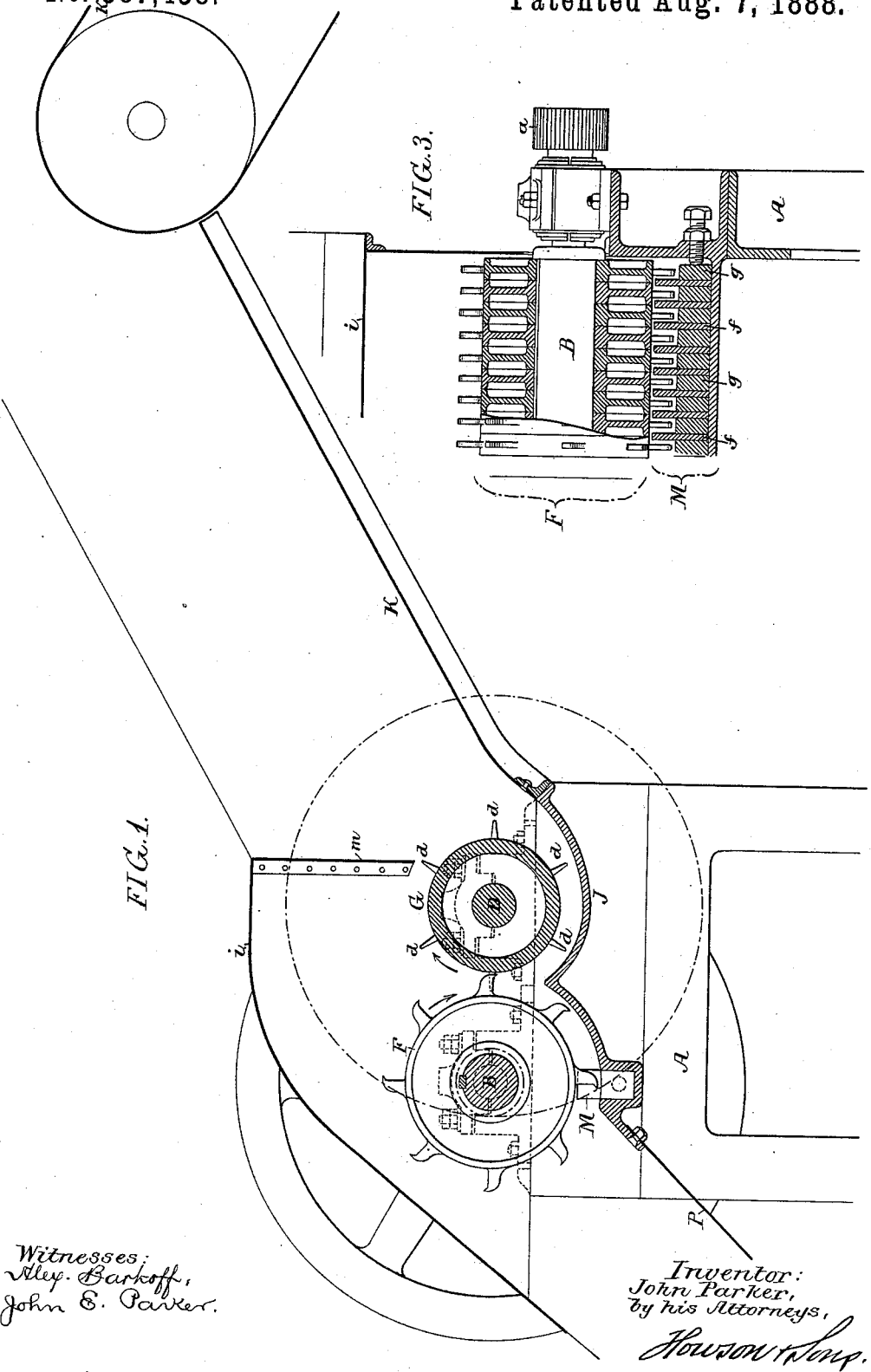
Witnesses:
Alex. Barkoff,
John E. Parker.
Inventor:
John Parker,
by his Attorneys,
Howson & Son.

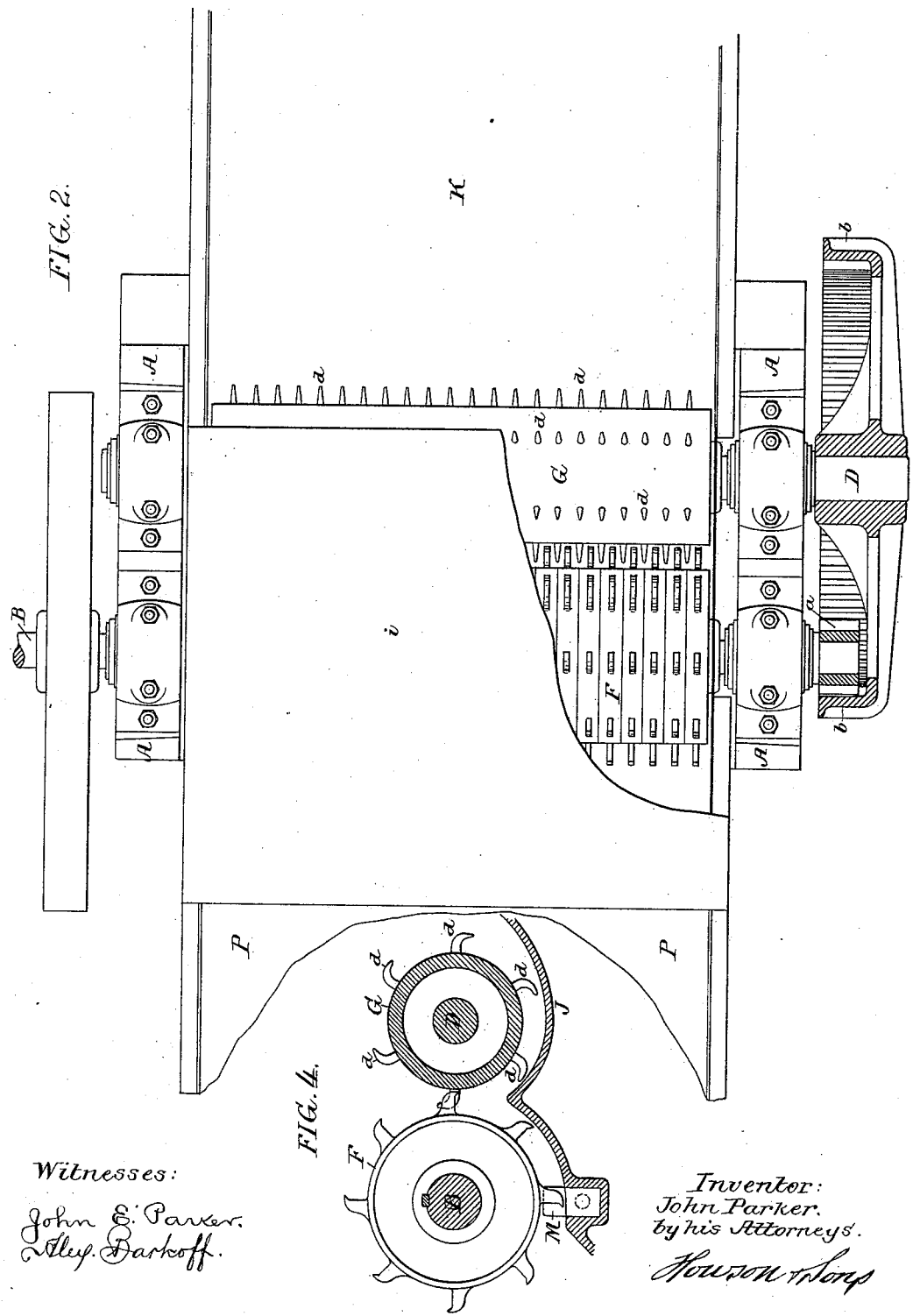

UNITED STATES PATENT OFFICE.

JOHN PARKER, OF PHILADELPHIA, PENNSYLVANIA.

CANE-SHREDDING MACHINE.

SPECIFICATION forming part of Letters Patent No. 387,438, dated August 7, 1888.

Application filed April 6, 1887. Serial No. 233,852. (No model.)

*To all whom it may concern:*

Be it known that I, JOHN PARKER, a subject of the Queen of Great Britain and Ireland, and a resident of Philadelphia, Pennsylvania, have invented certain Improvements in Cane-Shredding Machines, of which the following is a specification.

My invention relates to machinery for shredding sugar-cane prior to subjecting it to the action of the rolls, whereby the juice is expressed, the object of my invention being to so construct the machine as to feed the canes to the teeth of the shredding-drum in limited and uniform quantities, regardless of the amount of canes contained in the feed-chute, so that no injurious shocks or strains upon the machine are caused by reason of the indiscriminate feeding of masses of cane to the shredding-teeth, the uniform and positive feed of the canes to the shredding-teeth, moreover, insuring a uniform and positive feed of the shredded canes to the cane-mill, whereby, as the amount of work to be performed by the mill is unvarying, the power employed to drive the mill can be gaged accordingly, and the rolls can be so set that the highest possible percentage of juice will be expressed from the shredded canes.

In the accompanying drawings, Figure 1 is a longitudinal section of a cane-shredding machine constructed in accordance with my invention; Fig. 2, a plan view of the same, partly in section; Fig. 3, a transverse section of part of the machine, and Fig. 4 a diagram illustrating a modification of part of the invention.

A A are the opposite side frames of the machine, to suitable bearings on which are adapted two shafts, B and D, the former being driven by any suitable means, preferably by an engine direct, and having at its outer end a pinion, $a$, which engages with an internally-toothed spur-wheel, $b$, on the shaft D, whereby the shaft D is driven in the same direction as but at a rate of speed considerably less than that of the shaft B.

The shaft B carries a toothed shredding-drum, F, which is preferably composed of a series of toothed rings placed side by side upon the shaft, and confined longitudinally thereon, the shaft B having a feather adapted to ways in the rings, so that the latter are compelled to turn with the shaft.

The shaft D carries a cylinder, G, which is provided with rows of projecting pins $d$, arranged to pass between the teeth of the drum F, and beneath said cylinder is a trough, J, which extends transversely from one side frame to the other, and forms a continuation of the feed-chute K of the machine, on which the canes are deposited by a cane-carrier, K'.

Beneath the drum F is a shredder-bar, M, having teeth, between which the teeth of the shredder-drum pass, and although this bar may be made in one piece it is preferable to build it up of a number of plates, $f$, with intervening filling-pieces, $g$, as shown in Fig. 3.

The shredding-drum chamber has at the top a hood, $i$, and transversely across the chute K, above the feed-cylinder G, extends a guard-plate, $m$, which prevents the canes from gaining access to the teeth of the shredding-drum over the feed-cylinder G.

Both the shredding-drum and the feed-cylinder in the present instance rotate in the same direction, and the canes as they descend the feed-chute K, are caught by the pins or teeth of the feed-cylinder and carried along by the same through the trough J, and are delivered by the cylinder over the rise of the trough to the shredding-drum F, by the teeth of which they are carried down against the shredder-bar M, and are broken or shredded by the joint action of the teeth of said bar and those of the drum.

It will be observed that as regards the feeding of the canes to the shredding-drum my present machine differs essentially from that shown in my patent, No. 261,478, dated July 18, 1882, for in said patented machine the canes were fed to the top of the toothed cylinder and were carried around by the latter, and while descending and supported by the teeth of the cylinder were subjected to the action of the shredding-cylinder and were broken thereby. In this case quantities of canes were sometimes discharged from the upper pockets of the cylinder and fell into the path of the teeth of the shredding-drum before the proper time. The strain upon the gearing of the machine was therefore excessive at times and the delivering of shredded canes was not uniform; hence there was a varying feed of shredded canes to the mill, which detracted somewhat from the highest possible efficiency of the latter. By reversing the action of the feed-cylinder, however, the canes are fed to the teeth of the shredding-drum in limited and uniform quantities, as the canes are carried up the rise of the trough and reach the top of said rise before they are struck by the teeth of the drum, the rate of feed depending solely upon the speed of the cylinder; hence no following canes can possibly gain access to the drum until the proper time. Any canes that may be caught on the teeth will be removed therefrom by the action of the teeth of the drum owing to the overlapping of the two sets of teeth, the clogging of the feed-cylinder by canes which may be impaled upon the teeth of the same being thus prevented.

If desired, the canes may be supported by the teeth of the feed-cylinder when they are acted upon by the teeth of the shredding-drum, the breaking of the canes being effected by the action of the two sets of teeth, and the teeth of the feed-cylinder being preferably hooked, as shown in Fig. 4, so as to insure the carrying of the canes up to the teeth of the shredding-drum; but even in this case the use of the shredder-bar is preferred. The shredded cane passes from the shredder down an inclined chute or trough, P, to the crushing-rolls, so that after the canes are thrown upon the cane-carrier K' no further handling is required until the shredded canes have passed through the crusher-rolls and the juice has been expressed therefrom.

I am aware that a thrashing-machine has been combined with a toothed cylinder located above the inclined feed-chute of the machine, that part of the chute beneath the cylinder being pivoted and free to yield, so that stones or other hard foreign matters carried along with the grain will be struck by the teeth of the cylinder and driven through the opening of the cylinder. This device, however, cannot be used in a cane-shredding machine, as many of the canes lie crosswise of the chute, and would therefore be at liberty to pass through the opening in the bottom of said chute.

I am also aware that a thrashing-machine has been devised in which a chute providing a continuous support for the canes is combined with a feed-wheel having rearwardly bent or curved teeth; but such a construction of feed-wheel would be objectionable in a cane-shredding machine for the reason that the teeth would exert a considerable downward pressure or squeezing action upon the canes and would express a higher percentage of juice from said canes than is advisable. By forming the teeth so that they can act upon the canes point first, however, I am enabled to practically overcome this objection.

Without claiming, broadly, therefore, the combination of the shredder-drum and shredder-bar with a toothed cylinder located above the feed-chute, I claim as my invention and desire to secure by Letters Patent—

1. The combination, in a cane-shredding machine, of a toothed and rotating shredding-drum, a feed-cylinder having teeth overlapping those of the shredding-drum, means for rotating said cylinder so that its lower portion moves forward toward the drum, and a supply-chute directing the canes to the lower side of the toothed feed-cylinder and having a raised portion up which the canes must be carried by the teeth of the feed-cylinder before the teeth of the drum can act upon said canes, all substantially as specified.

2. The combination, in a cane-shredding machine, of a toothed and rotating shredding-drum, a toothed shredder-bar, a feed-cylinder having pointed teeth projecting from the cylinder, point first, toward the canes, a feed-chute directing the canes to the under side of the feed-cylinder and forming a continuous support for the canes beneath said cylinder, and mechanism for so rotating the cylinder that the lower portion of the same moves forward toward the drum, all substantially as specified.

3. The combination, in a cane-shredding machine, of the toothed and rotating shredding-drum, the toothed shredder-bar, the toothed feed-cylinder, means for so rotating the latter that its lower portion moves forward toward the drum, and a feed-chute directing the canes to the under side of the feed-cylinder and having a raised portion up which the canes are carried before coming within range of the teeth of the shredder-drum, all substantially as specified.

In testimony whereof I have signed my name to this specification in the presence of two subscribing witnesses.

JOHN PARKER.

Witnesses:
JOHN E. PARKER,
HARRY SMITH.